United States Patent [19]

Krogerus et al.

[11] Patent Number: 4,737,186

[45] Date of Patent: Apr. 12, 1988

[54] METHOD FOR CONTINUOUS REDUCTION OF MOLTEN METALLURICAL SLAG IN AN ELECTRIC FURNACE

[75] Inventors: Erkki V. S. Krogerus, Espoo; Timo T. Talonen, Nakkila, both of Finland

[73] Assignee: Outokumpu Oy, Helsinki, Finland

[21] Appl. No.: 33,536

[22] Filed: Apr. 3, 1987

Related U.S. Application Data

[63] Continuation-in-part of Ser. No. 866,575, May 22, 1986.

[30] Foreign Application Priority Data

May 31, 1985 [FI] Finland ................................. 852184
May 9, 1986 [SE] Sweden ................................. 8602113
May 13, 1986 [AU] Australia ............................ 57401/86
May 14, 1986 [CA] Canada ................................... 509100
May 20, 1986 [DE] Fed. Rep. of Germany ....... 3616868

[51] Int. Cl.$^4$ ............................................... C21B 4/00
[52] U.S. Cl. ........................................ 75/10.35; 75/24

[58] Field of Search ...................... 75/24, 10.35, 10.59

[56] References Cited

U.S. PATENT DOCUMENTS

| | | | |
|---|---|---|---|
| 3,579,328 | 5/1971 | Aas ........................................... | 75/24 |
| 3,585,024 | 6/1971 | Cenerazzo ............................... | 75/24 |
| 4,032,327 | 6/1977 | Donaldson ............................... | 75/24 |
| 4,110,107 | 8/1978 | Paulson .................................... | 75/24 |

Primary Examiner—Peter D. Rosenberg
Attorney, Agent, or Firm—McAulay, Fields, Fisher, Goldstein & Nissen

[57] ABSTRACT

A method for the continuous recovery of non-iron metals from a molten metallurgical slag containing lead, copper or nickel by continuously reducing the layer with carbon dust. The metal layer produced at the furnace bottom is maintained sufficiently thin so that it is between 0 and 20 mm thick. Injection of carbon dust into the metal layer is avoided.

20 Claims, No Drawings

METHOD FOR CONTINUOUS REDUCTION OF MOLTEN METALLURICAL SLAG IN AN ELECTRIC FURNACE

This application is a continuation-in-part of Ser. No. 866,575 filed on May 22, 1986.

BACKGROUND OF THE INVENTION

The method of the present invention is related to the continuous recovery of non-iron metals from a molten non-iron metal slag in an electric furnace, whereinto fresh, oxidized slag from the smelting of non-iron metals continuously flows. The reduction is carried out by injecting carbon dust into the slag layer.

DESCRIPTION OF THE PRIOR ART

In the prior art, there is known the method described in the U.S. Pat. No. 1,822,588 for reducing copper or other heavy metal. The reducing of the slag takes place in a furnace resembling a copper converter in a batch process so that either a solid, liquid or gaseous reducer is injected into the batch. An advantageous solid reducer is carbon dust, the carrier gas whereof is air or aqueous steam. The employed liquid reducers can be liquid hydrocarbons, and the gaseous reducers respectively gaseous hydrocarbons, carbon monoxide, etc.

Another prior art method is the method specified in the U.S. Pat. No. 4,110,107 for reducing iron-copper and iron-nickel slags in an electric furnace by means of injecting carbon dust. The injection is performed into the metal layer created below the slag layer.

The aforementioned methods comprise some drawbacks. The reduction of slag in a batch process is a fairly difficult task, because the injection of carbon dust into oxidized slag brings about a bubbling reaction which is so strong that it causes a powerful bubbling over effect. As a consequence, the batch flows over from the furnace. When the reduction is carried out into the metal layer created below the slag layer, there is simultaneously created a flotation effect caused by the gas bubbles, which effect lifts metal up into the slag layer, thus resulting in mechanical metal losses in the waste slag.

In the method according to the DE Patent Application No. 2,900,676, the slag reduction is carried out by means of a coke bed fed onto the slag surface. The slag layer located below the coke bed is formed so that nearest to the coke bed there is reduced slag, which is poor in valuable metals, and that at the bottom of the slag layer the less reduced slag falls, which is thus richer in valuable metals, the density of the latter being, due to the valuable metals, higher than the density of the reduced slag. It is clear that the reduction in a situation like this takes place very slowly. In order to speed up the reduction, in the method some non-oxidizing gas is conducted to the inside of the molten slag in order to achieve mixing by means of this gas, and in order to get the oxidized slag into contact with the coke bed. The non-oxidizing gas is mainly an inert gas such as nitrogen, but part of the gas may also be a reducing gas such as natural gas.

SUMMARY OF THE INVENTION

According to the method of the present invention, in which molten slag is continuously fed into an electric furnace where it is continuously reduced by means of carbon dust injections into the slag layer, the drawbacks of the above described methods can be avoided.

A satisfactory reduction of the slag requires a sufficient mixing in the slag. In the DE Patent Application No. 2,900,676, the mixer of the slag and the reducing agent is gas. Because the reducing agent in this case is a coke bed located on the surface, it is difficult to enforce a satisfactory contact between the oxidized slag and the reducing agent by means of gas blowing. In the method described in the U.S. Pat. No. 4,110,107, the reduction is carried out by injecting carbon dust, and the injection is performed essentially into the metal layer. Because the density of for instance metallic copper and nickel is about 8.9 g./cm$^3$, this molten metal, during injection, brings about a counterpressure, wherefore the carbon dust and the gas bubbles created around it are not dispersed in small bubbles into the molten metal and slag, but they form larger bubbles which tend to rise up to the surface of the slag layer, and this obstructs the carbon dust from mixing well into the slag and reacting with the slag. The density of the molten slag is between 3.2–3.5 g/cm$^3$, so that the counterpressure affected by them for the injection spray is not as high as the pressure caused by the molten metal, and the dispersing of carbon dust in small particles into the slag is easier; moreover, the reducing efficiency is simultaneously increased.

As was stated above, the slag reduction by means of carbon dust injection in batch process is difficult owing to bubbling. For example, when reducing slag with a high lead content, the slag may bubble over according to two different mechanisms. In the case of bubbling over, the reduction must be interrupted, or completely stopped. This may often lead to serious damages to the equipment as well.

Firstly the effect of bubbling over may take place for instance when lead slag is highly oxidized, and the lead contents are respectively high. When this oxidized slag is reduced by means of carbon or by means of some other gas-producing reducer, the reactions are so quick, that there is no time for all of the gases to emerge out of the slag, but the slag volume grows, and the reaction leads to powerful splashing. In this case, the reducing process is immediately interrupted.

The effect of bubbling over may also be caused by the fact that a phase with a high melting point is separated in the slag, the phase making the slag solid and extremely impermeable to gas. In lead slag, such a phase may be for example zinc ferrite, $ZnFe_2O_4$. If the slag is then reduced by means of carbon or some other gas-producing reducer, the slag continues expanding, fills up the reactor and finally bursts out. It is generally very difficult to readjust such a reduction batch, wherefore it is often lost; at the same time, there exists a big risk for the equipment to be damaged.

According to the new method of the present invention, molten slag is continuously fed into an electric furnace, to be mixed with the already partly reduced slag therein, and simultaneously the slag is continuously reduced by injecting carbon dust into the slag layer. As was stated above, the bubbling caused by the reduction of the oxidized slag can be prevented by employing this method, because the highly oxidized slag entering the electric furnace is first mixed with the partly reduced slag already present in the furnace, before the fresh slag reacts with the carbon dust. Another advantage achieved by employing the continuous reducing method is that the formation of highly viscous compounds such as zinc ferrite spinels is prevented, and the bubbling over of the slag according to this mechanism does not take place either.

When following the new method of the present invention, gases are not created in the initial reduction of oxidized slag with a high oxygen pressure, and consequently bubbling is not brought about by gas production. In oxidized slag, the major part of the iron is trivalent, and the slag also contains plenty of non-iron metal oxides such as copper oxide and lead oxide. When this slag is mixed into the reduced slag, where the oxide content of the non-iron metals is low and where iron exists mainly in bivalent form, the reduction of oxidized slag takes place. The bivalent form of the reduced slag reduces the non-iron metal oxides of the oxidized slag, and is itself oxidized into trivalent iron.

The oxygen pressure of the slag is directly comparable to the non-iron metal content of the slag, while metal is present in the metal phase with activity 1. Thus, for instance, while reducing slag with a lead content, the ratio between the trivalent and bivalent iron in the slag is directly dependent on the lead content of the slag. Consequently this ratio between the trivalent and bivalent iron can be considered as an indicator of the sensitivity to bubbling. The ratio $Fe^{3+}/Fe^{2+}$ in slag obtained from a flash smelting furnace is generally over 0.75, and mixed with a partly reduced slag in the electric furnace, the ratio $Fe^{3+}/Fe^{2+}$ is diminished to 0.50-0.18, and the slag can be injected without danger of bubbling.

As was already pointed out, it is advantageous, as regards a good dispersing of the injected reducing agent, to perform the injection into the slag layer. Therefore it is profitable that the metal layer created below the slag layer is maintained as thin as possible and preferably within the range of 0 to 20 cm. Therefore, the metal layer below the slag layer is to be maintained at a thickness, preferably less than 20 cm. Sufficiently thin means to maintain the metal layer produced at the furnace bottom less than 20 cm. Keeping the metal layer thin is advantageous also because while for instance the lead density is over 11 g/cm$^3$, a thick metal layer sets special strength requirements tor the furnace structures.

The danger with such electric furnaces where metal is produced is that particularly the temperature of the metal bath is decreased because metal has a high conducting capacity, and only a small amount of heat is created therein. The electric currents created between the electrodes mainly heat the slag layer, wherefrom the heat is transferred to the metal layer by means of conducting. If the metal layer is thick, there exists the danger that speiss is formed in between the slag layer and the metal layer, or at the bottom. The speiss layer is formed by the impurities arsenic, antimony and tin, together with cobalt, nickel, copper and iron. The melting point of the speiss is high, and therefore it may cause difficulties in the electric furnace operation, for instance by blocking the outlet openings. The damages may become remarkable, particularly if the metal to be recovered from the slag is lead. The created speiss layer may be half-solid or solid, in which case it considerably interferes with the control of the furnace. Even it a furnace did not contain the said impurities in a quantity required for the formation of speiss, for example, from lead bullion is precipitated copper sulphide and metallic copper while the temperature is decreased. These tend to accumulate at the bottom and in the outlet openings of the furnace.

In order to avoid the above described problems, it is advantageous that the discharge equipment of the metal produced at the furnace bottom is arranged so that the layer of metal located below the slag is always very thin. Thus the heat developed in the slag is able to maintain a sufficiently high temperature in the furnace from top to bottom. It is preferred that the heat from the top to the bottom in the furnace be maintained within the range of 1150° to 1350° C. Sufficiently high temperature means to maintain the temperature within the range of 1150° C. to 1350° C. Moreover, when the metal layer is thin, there is avoided any possible injection of the carbon dust into the metal layer, which would lead to a flotation effect, as was pointed out before. The metal layer is maintained thin and preferably less than 20 cm, for instance, by means of a continuous tapping of the metal. It is also possible to install a groove-like recess at the bottom of the furnace, so that the molten metal flows into the groove, and metal can be recovered therefrom either continuously or periodically.

When the slag reducing process is started in the furnace, the furnace is first filled with the slag, and in order to avoid bubbling, the slag is reduced by means of a coke bed or in another suitable fashion. The continuous feeding of oxidized slag takes place only in this reduced slag.

The coke bed can be maintained on top of the slag layer also at other times than the beginning stage, even if the reduction proper is carried out by means of a carbon dust injection. In that case, the coke bed serves as a heat insulating layer between the gas phase and the molten phase of the furnace. Zinc and lead are evaporated in the injection reduction of lead slag, because the gases created inside the molten slag can be saturated with these metals. If there is a layer of coke on top of the molten slag, the temperature of the coke layer being lower than that of the molten slag, part of the metals in the gas are condensed in the coke layer and flow back into the molten slag. Consequently, the dust amount in an electric furnace can thus be decreased.

A continuous feeding of oxidized slag into an electric furnace does not require that the reducing agent be injected into a certain part of the furnace especially, because the mixing of the fresh slag into the slag already present in the furnace is carried out so efficiently that the injection into the slag layer can be done even in the very same spot in the furnace where the fresh slag is fed into the surface. Naturally it is advantageous that the injection is carried out symmetrically with respect to the electrodes of the electric furnace, so that the slag flowing on one side of the electrodes is not more reduced than the slag flowing on the other side, wherefore several lances are employed.

The slag fed into an electric furnace is in most cases obtained from a flash smelting furnace where the employed flux (i.e. the slag forming agent) is lime. Lime speeds up the reducing reactions in the electric furnace, and if the amount of lime contained in the slag is not sufficient, it is added into the electric furnace. Normally the activity of for instance lead oxide in iron silicate slag is weak, but a lime addition increases the activity. Advantageously the ratio $CaO/SiO_2$ in the slag from an electric furnace is higher than 0.6. When the ratio exceeds 1, the lime is not dissolved anymore, but remains in lumps, wherefore an advantageous ratio $CaO/SiO_2$ is between 0.6 and 1.0.

In the above specification, lead slag was mentioned as an example of reduced non-iron metal slag. In addition to that, the method of the invention can be employed for treating for instance copper and nickel slags, in which case the created metal is blister copper or nickel.

By aid of the appended examples, our purpose is to show that the method is proved to be suitable for slags of different types. Example 1 is a reference example where the slag reduction was carried out in a batch process.

EXAMPLE 1

(Reference example)

A 1800 kg lead slag batch was reduced in a kiln furnace by injecting carbon into the molten slag.

| Pb | Cu | Fe | Zn | SiO$_2$ | Al$_2$O$_3$ | MgO | CaO |
|---|---|---|---|---|---|---|---|
| Molten slag analysis: | | | | | | | |
| Ladle sample from the surface: | | | | | | | |
| 28.0 | 2.9 | 10.5 | 6.2 | 18.9 | 2.5 | 8.4 | 12.2 |
| Sample from inside the slag bath: | | | | | | | |
| 39.4 | 3.1 | 8.5 | 5.8 | 16.5 | 2.2 | 5.5 | 10.0 |

Immediately after starting of the reduction, a remarkable overflowing took place. It was possible to continue the reduction only after part of the molten slag was discharged from the furnace and thus lost.

| Pb | Cu | Fe | Zn | SiO$_2$ | Al$_2$O$_3$ | MgO | CaO |
|---|---|---|---|---|---|---|---|
| Analysis of the reduced slag: | | | | | | | |
| 1.7 | 0.17 | 14.3 | 4.0 | 29.4 | 4.5 | 12.1 | 19.8 |

EXAMPLE 2

By employing a continuous reducing method, there was treated both slag of the same type as in the above batch process, and slag with a high iron content or a high lead content. There was no bubbling over during the reduction, and the reduction process was satisfactorily completed. Below are listed analyses of these slags both before and after the reduction.

| Pb | Zn | Cu | Fe | SiO$_2$ | Al$_2$O$_3$ | MgO | CaO |
|---|---|---|---|---|---|---|---|
| Batch process-type slag: | | | | | | | |
| Oxidized slag: | | | | | | | |
| 27.0 | 5.9 | 1.4 | 9.8 | 10.2 | 3.2 | 6.0 | 14.3 |
| Reduced slag: | | | | | | | |
| 3.2 | 4.0 | 0.26 | 15.8 | 30.0 | 5.3 | 11.3 | 19.6 |
| Slag with a high iron content: | | | | | | | |
| Oxidized slag: | | | | | | | |
| 22.3 | 6.6 | 0.34 | 25.4 | 18.1 | 1.1 | 0.70 | 12.1 |
| Reduced slag: | | | | | | | |
| 2.0 | 6.4 | 0.12 | 34.9 | 24.6 | 1.7 | 1.0 | 15.7 |
| Slag with a high lead content: | | | | | | | |
| Oxidized slag: | | | | | | | |
| 45.0 | 6.1 | 0.7 | 12.6 | 10.6 | 1.6 | 2.7 | 7.1 |
| 56.0 | 5.5 | 0.5 | 9.5 | 8.8 | 1.3 | 2.3 | 5.6 |
| Reduced slag: | | | | | | | |
| 2.7 | 3.8 | 0.1 | 26.3 | 24.8 | 4.8 | 6.6 | 16.1 |
| 5.5 | 7.5 | 0.1 | 25.0 | 24.8 | 4.0 | 5.6 | 14.3 |

EXAMPLE 3

The height of the layer of the bullion in the electric furnace was measured with a bar. When the height was 22 cm it could be found that there was in the bottom of the furnace still an incrust of 7 cm of solidified bullion. When the slag lying above the bullion was tapped, the analysis of the slag showed that there was 15.5 weight-% lead in the slag.

The height of the bullion was settled until it was 10 cm. It was found that when the height of the bullion began to settle, also the incrust began to smelt. Therefore, the height of the bullion has to be thinner than 20 cm. The analysis of the slag when the height of the bullion was 10 cm showed that the concentration of lead in the slag was between 2–3%.

Therefore, by settling the height of the bullion the temperature can be provided to be sufficiently high for maintaining all the bullion in a molten state. In the same way, the mixing of bullion and slag can also be avoided.

While there has been described what is considered to be the preferred embodiments of the invention, numerous changes and modifications may be made therein without departing from the scope of the invention as defined in the appended claims, and the invention may be practiced otherwise than particularly described.

What is claimed is:

1. A method for the continuous recovery of non-iron metals from a molten metallurgical slag containing lead, copper or nickel in a continuous reducing process to prevent the formation of highly viscous compounds and bubbling over of the slag, and in which carbon dust is used to reduce the slag, comprising the steps of:

continuously feeding fresh, molten, oxidized, non-iron metal slag into an electric furnace having partly reduced slag already present in the furnace;

mixing the continuously fed non-iron metal slag with the reduced slag to form a slag layer;

continuously reducing the slag layer by injecting carbon dust into the slag layer thereby reducing the bubbling over of the slag; and maintaining the metal layer produced at the furnace bottom sufficiently thin so that it is between 0 and 20 cm, whereby to avoid injection of carbon dust into the metal layer and to provide for a sufficiently high temperature in the furnace from top to bottom, thereby preventing the formation of the highly viscous compounds making the slag solid and impermeable to gas.

2. The method of claim 1, including the step of continuously tapping metal out of the furnace to maintain the metal layer created at the furnace bottom thin.

3. The method of claim 1, wherein the highly oxidized slag is first mixed with the partly reduced slag already present in the furnace prior to tne slag reaching the carbon dust tor reaction therewith.

4. The method of claim 1, wherein the mixing of the fresh slag with the partly reduced slag in the furnace diminishes the ratio of $Fe^{3+}/Fe^{2+}$ to 0.50–0.18 so that the resultant slag can be injected without bubbling.

5. The method of claim 1, including the step of controlling the thickness of the metal layer to maintain the thin layer by withdrawing the metal from the furnace.

6. The method of claim 5, including withdrawing the metal periodically.

7. The method of claim 5, including withdrawing the metal continuously.

8. The method of claim 1, wherein the injection of carbon dust takes place symmetrically with respect to the electrodes of the electric furnace.

9. The method of claim 1, wherein the non-iron metal slag is lead slag and the produced metal is lead bullion.

10. The method of claim 1, wherein the non-iron metal slag is copper slag and the produced metal is blister copper.

11. The method of claim 1, wherein the non-iron metal slag is nickel slag and the produced metal is nickel.

12. The method of claim 1, wherein the ratio $CaO/SiO_2$ of the slag is adjusted between 0.6 and 1.0.

13. The method of claim 1, wherein a coke bed is kept on top of the slag layer in the electric furnace.

14. The method of claim 1, including the step of continuously tapping metal out of the furnace to prevent the formation of the speis.

15. A method for the continuous recovery of non-iron metals from a molten metallurgical slag containing copper, lead or nickel in a continuous reduction process to prevent the formation of highly viscous compounds and bubbling over of the slag, and in which carbon dust is used to reduce the slag, comprising the steps of:
providing partly reduced slag in an electric furnace;
continuously feeding fresh, molten, oxidized, non-iron metal slag into the electric furnace having the partly reduced slag already present in the furnace;
mixing the continuously fed non-iron metal slag with the reduced slag to form a slag layer;
continuously reducing the slag layer by injecting carbon dust into the slag layer for eliminating the bubbling over of the slag; and
continuously tapping metal out of the furnace to maintain the metal layer created at the furnace bottom less than 20 cm and to provide for a sufficiently high temperature in the furnace from top to bottom in the range of 1150° C. to 1350° C.

16. The method of claim 15, wherein the major part of the iron in the oxidized slag is tri-valent and the iron in the non-iron metals is mainly bivalent.

17. The method of claim 15, including the provision of groove-like recesses at the bottom of the furnace to control the thickness of the thin layer at the bottom of the furnace, including the step of removal of the molten metal from the furnace through said recesses.

18. The method of claim 15, wherein a coke bed is kept on top of the slag layer in the electric furnace in order to avoid bubbling when the furnace is first filled with the slag, and the coke bed also serves as a heat insulating layer between the gas phase and the molten phase of the furnace.

19. The method of claim 15, wherein the injection of carbon dust takes place symmetrically with respect to the electrodes of the electric furnace, and the carbon dust is applied solely to the slag formed from the reduced slag in the furnace and the highly oxidized non-iron metal slag.

20. A method for recovering non-iron metals from molten metallurgical slag containing essentially lead, copper or nickel in a continuous reduction process, including the steps of:
continuously feeding molten, oxidized, non-iron metal slag into an electric furnace having reduced slag already present in the furnace;
mixing the continuously fed non-iron metal slag with the reduced slag already present in the furnace;
injecting carbon dust solely into the slag layer for continuously reducing the slag by the injected carbon dust to reduce the bubbling over of the slag; and
solely continuously tapping metal out of the furnace to maintain the metal layer created at the furnace bottom less than 20 cm for rendering the slag impermeable to gas.

* * * * *